US006947297B2

(12) United States Patent
Ke et al.

(10) Patent No.: US 6,947,297 B2
(45) Date of Patent: Sep. 20, 2005

(54) ACTIVE RESONANT SNUBBER FOR DC-DC CONVERTER

(75) Inventors: Zhongwei Ke, Taoyuan Shien (TW); Yahong Xiong, Taoyuan Shien (TW); Bin Jin, Taoyuan Shien (TW); Alpha J. Zhang, Taoyuan Shien (TW)

(73) Assignee: Delta Electronics, Inc., Taoyuan (TW)

( * ) Notice: Subject to any disclaimer, the term of this patent is extended or adjusted under 35 U.S.C. 154(b) by 140 days.

(21) Appl. No.: 10/679,721

(22) Filed: Oct. 4, 2003

(65) Prior Publication Data

US 2005/0073861 A1 Apr. 7, 2005

(51) Int. Cl.[7] .............................................. H02M 3/335
(52) U.S. Cl. ....................................................... 363/20
(58) Field of Search ................................ 363/20, 21.01, 363/39, 40; 323/222, 290

(56) References Cited

U.S. PATENT DOCUMENTS 3,694,730 A * 9/1972 Hoft et al. ................... 363/139
6,191,960 B1 * 2/2001 Fraidlin et al. ............... 363/25
6,259,235 B1 * 7/2001 Fraidlin et al. ............. 323/222

* cited by examiner

*Primary Examiner*—Adolf Berhane
(74) *Attorney, Agent, or Firm*—Silicon Valley Patent Group LLP

(57) ABSTRACT

The present invention proposes an improved circuit design and configuration of a DC-DC converter with resonant reset. In this present invention, the active resonant snubber in parallel to a primary winding of a transformer of a DC-DC converter for resetting the transformer includes a resonant capacitor, an active switch connected to the resonant capacitor in series, an auxiliary diode coupled across the active switch in parallel, and an auxiliary winding coupled with the transformer. When a main switch of the DC-DC converter is turned off, the auxiliary winding turns on the active switch, and then the transformer is reset by a resonance between a magnetizing inductor of the transformer and the resonant capacitor.

9 Claims, 6 Drawing Sheets

ACTIVE RESONANT SNUBBER FOR DC-DC CONVERTER

FIELD OF THE INVENTION

The present invention relates to a power supply system and more specifically to an improved circuit design and configuration of a DC-DC converter with resonant reset.

BACKGROUND OF THE INVENTION

A single switch forward type DC-DC converter is widely used in the middle and low power conversion occasion due to the simplicity of the structure. For the transformer of a forward DC-DC converter, there are many magnetic reset methods, for example RCD reset, third winding reset, LCD reset, resonant reset, and active clamp reset. The resonant reset and active clamp reset are the most common employed methods because they can realize the bi-directional magnetizing of the transformer core, and obtain the duty cycle larger than 0.5. The bi-directional magnetic current is available for improving the anti-saturation of the transformer core and decreasing the transformer size. Furthermore, the duty cycle larger than 0.5 is available for decreasing the voltage stress of the secondary rectifier, and decreasing the filter size and improving the dynamic performance of the converter.

FIG. 1A and FIG. 1B respectively show the configuration and key operation waveforms of a resonant reset forward DC-DC converter of the prior art. The resonant reset forward DC-DC converter is a very simple circuit structure. There is only one main switch S employed in the primary side of the transformer Tr, and a resonant reset capacitor Cr in parallel with the primary winding of the transformer Tr. When the main switch S is turned on, the primary winding of the transformer Tr is connected to the input voltage Vin. The transformer core is magnetized positively and energy is delivered from the source to the load by the transformer coupling. When the main switch S is turned off, the magnetizing current of the transformer Tr charges the resonant capacitor Cr, and the voltage of capacitor Cr increases and resets the transformer core. After a half of resonant period the magnetizing current is reset from the positive maximum value to the negative maximum value, and the voltage of the primary winding remains zero due to the cross conduction of the secondary rectifier. The voltage of the capacitor Cr maintains the same voltage as Vin until the main switch S is turned on again. When the main switch S is turned on, the capacitor Cr is discharged through the main switch S, and the energy stored in the capacitor Cr is dissipated on the main switch S. Thus, the power loss of the main switch S becomes larger. Especially for high frequency and/or high input voltage application, the power loss of the main switch S increases significantly because the energy stored in the capacitor Cr increases with the increase of the switching frequency and the input voltage Vin.

FIG. 2A and FIG. 2B respectively show the configuration and key operation waveforms of the forward DC-DC converter with active clamp reset of the prior art. In this converter the main switch S is employed in the primary side of the transformer Tr, and an active clamp branch including an active switch Sa, an auxiliary diode Da and a clamping capacitor Ca is connected in parallel with the primary winding of the transformer Tr. The auxiliary diode Da is couple across the active switch Sa in parallel. The auxiliary diode Da can also be the parasitic diode of the active switch Sa. An additional driver is employed to keep the main switch S and the active switch Sa conducting complementally. When main switch S is turned on and the active switch Sa is turned off, the primary winding of the transformer Tr is connected to the input voltage Vin. The transformer core is magnetized positively and energy is delivered from the source to the load by the transformer coupling. When the main switch S is turned off and the active switch Sa is turned on, the magnetizing current charges the clamping capacitor Ca. The voltage of the clamping capacitor Ca is coupled across the primary winding of the transformer Tr and resets the transformer Tr. When the active switch Sa is turned off, the magnetizing current is reset from the positive maximum value to the negative maximum value and the clamping capacitor Ca is disconnected from the main switch S. As a result, the energy stored in the clamping capacitor Ca will not dissipate at the time when the main switch S is turned on. Hence, comparing to resonant rest method, the active clamp reset method is a lossless magnetic reset method, but it bears more complicated circuit structure since the active switch Sa needs an additional floating high side driver. Such high side driver needs to float hundreds of voltage, so it increases the converter cost greatly.

Therefore, a demand still exists to provide a new and improved power converter topology that combines the advantages of the resonant reset forward converter and the active clamp forward converter, but overcomes the disadvantages of the prior art.

It is therefore attempted by the applicant to deal with the above situation encountered with the prior art.

SUMMARY OF THE INVENTION

It is therefore an object of the present invention to propose a novel and improved active resonant reset DC-DC converter in which an active resonant reset branch is employed to reset the transformer.

It is therefore another object of the present invention to propose a novel and improved active resonant reset DC-DC converter in which the transformer is magnetized in bi-directional and the duty cycle of the DC-DC converter can be larger than 0.5.

It is therefore another object of the present invention to propose a novel and improved active resonant reset DC-DC converter in which the driving of the active switch can be realized by a simple and low cost driving circuit.

The present invention may best be understood through the following description with reference to the accompanying drawings, in which:

DETAILED DESCRIPTION OF THE PREFERRED EMBODIMENT

Although this invention is susceptible to embodiments of many different forms, a preferred embodiment will be described and illustrated in detail herein. The present disclosure exemplifies the principle of the invention and is not being considered a limitation to the broader aspects of the invention to the particular embodiment as described.

Figure 1A:
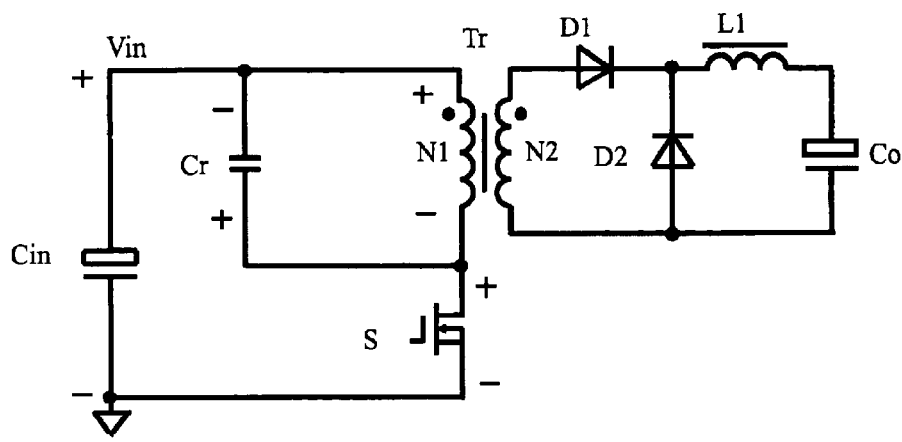
FIG. 1A is a schematic diagram of a conventional resonant reset forward DC-DC converter of the prior art.
Figure 1B:
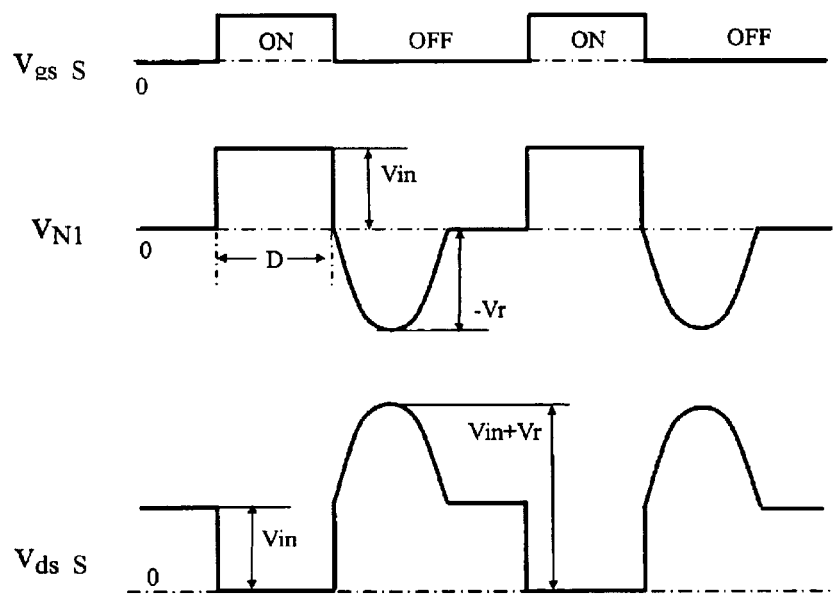
FIG. 1B illustrates the key operation waveforms of the resonant reset forward DC-DC converter of FIG. 1A.
Figure 2A:
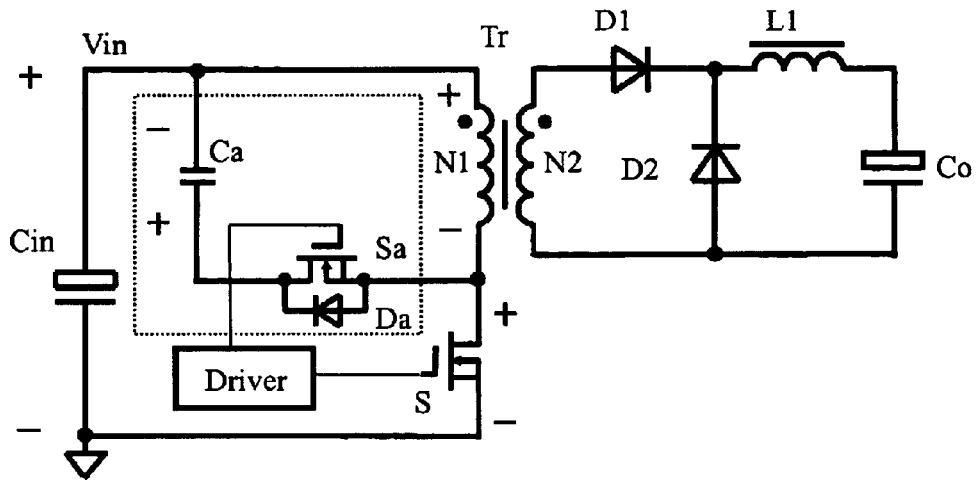
FIG. 2A is a schematic diagram of a conventional active clamp forward DC-DC converter of another prior art.
Figure 2B:
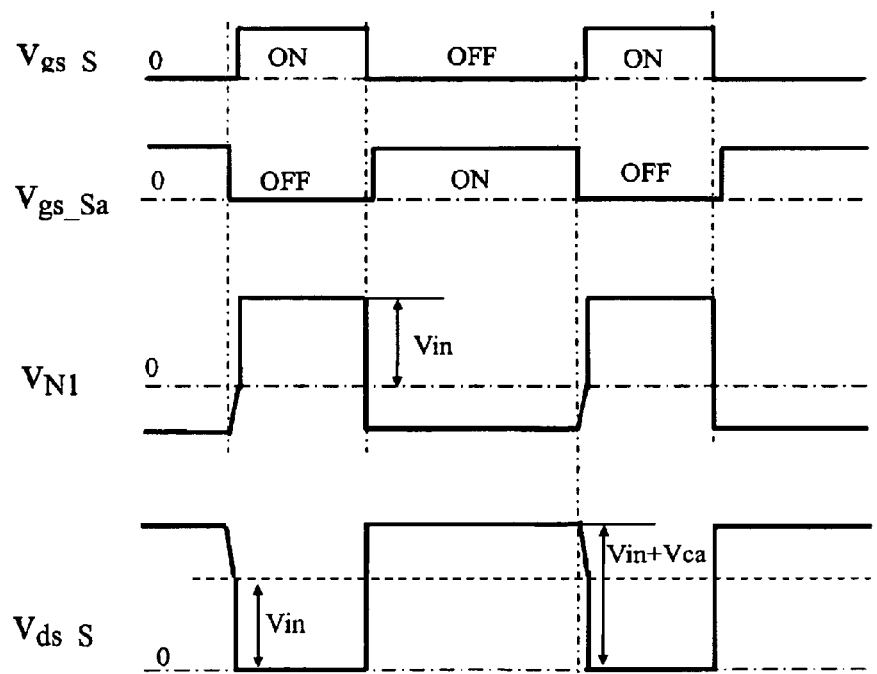
FIG. 2B illustrates the key operation waveforms of the active clamp forward DC-DC converter of FIG. 2A.
Figure 3A:
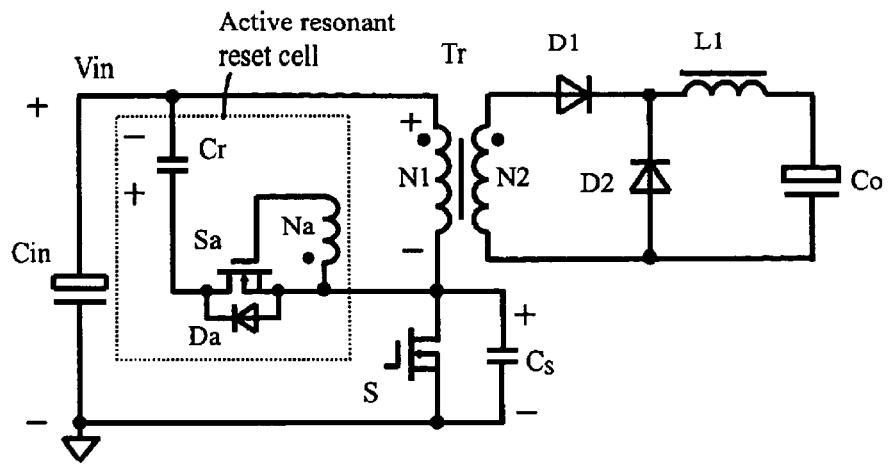
FIG. 3A is a schematic diagram of an active resonant reset forward DC-DC converter in accordance with a preferred embodiment of the present invention.

Please refer initially to FIG. 3A, which is a schematic diagram of an active resonant reset forward DC-DC converter in accordance with present invention. In the active resonant reset forward DC-DC converter, there is a power transformer Tr having a primary winding N1 and a secondary winding N2 isolated the primary side circuit and the secondary side circuit. At the primary side, the primary winding is coupled to an input DC voltage source Vin via a main switch S. An active resonant snubber is connected to the primary winding of the transformer in parallel to reset the transformer Tr. Such active resonant cell is consisted of an active switch Sa, an auxiliary diode Da, an auxiliary winding Na coupled with the transformer and a resonant capacitor Cr. The active switch Sa is connected to the resonant capacitor Cr in series, and the auxiliary diode Da is couple across the active switch in parallel in which the auxiliary diode Da also can be the parasitic diode of the active switch Sa. The auxiliary winding Na is used to drive the active switch Sa. The terminal of the auxiliary winding Na having the opposite polarity with the primary winding is connected to the gate terminal of the active switch Sa, and the terminal of the auxiliary winding Na having the same polarity with the primary winding is connected to the source terminal of the active switch Sa. When the main switch S is turned off, such auxiliary winding Na makes the active switch Sa turn on. As a result the primary winding N1 is connected to the resonant capacitor Cr in parallel. Therefore, the transformer core is reset by the resonance between the magnetizing inductor of the transformer and the resonant capacitor Cr. After a half of resonant period, the auxiliary winding Na makes the active switch Sa turn off, and the resonant capacitor Cr is disconnected from the primary winding N1. By this way, the resonant capacitor energy will not dissipate at the time instant when the main switch S is turned on.

At the secondary side, the secondary winding N2 is connected to a half-wave diode rectifier which is consisted of a forward diode D1, a freewheeling diode D2, an output choke L1 and an output capacitor Co.

Figure 3B:
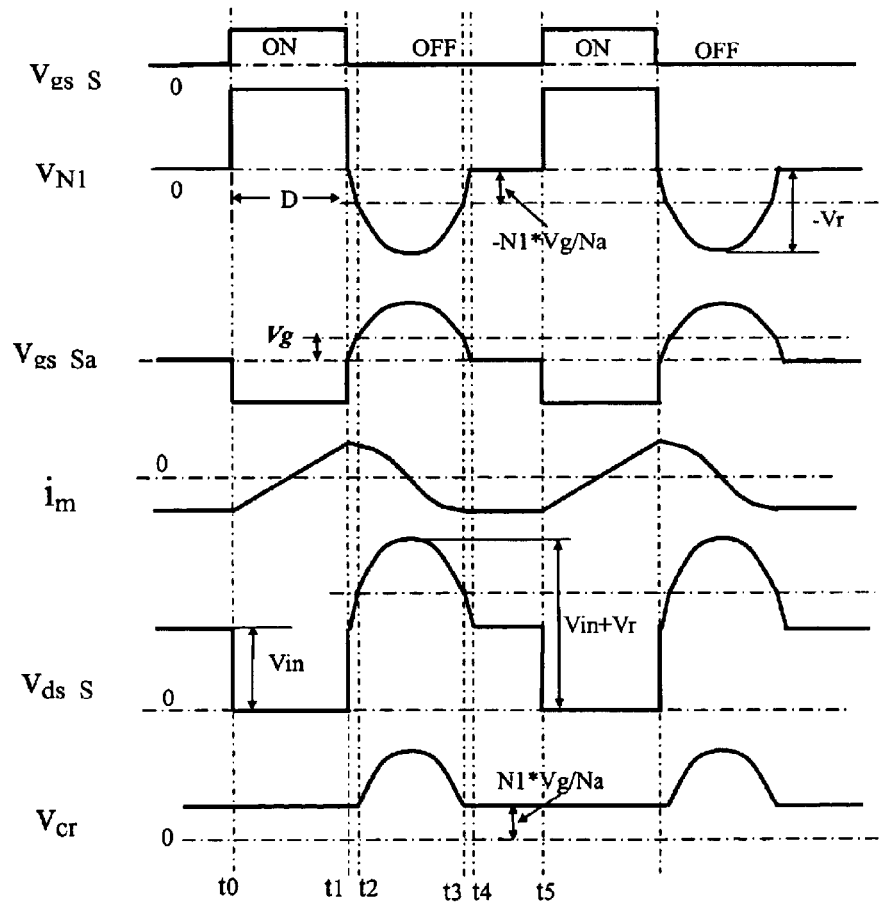
FIG. 3B illustrates the key operation waveforms of the active resonant reset forward DC-DC converter of FIG. 3A.

To illustrate the detailed operation and show the features of this converter, FIG. 3B illustrates the key operation waveforms of the active resonant reset forward DC-DC converter of FIG. 3A. Several time intervals are described as fellows:

$$t0 < t < t1 \quad [1]$$

In this time interval, the main switch S is turned on, and the positive input voltage Vin is applied to the transformer primary winding N1. Then the auxiliary winding Na induces a negative voltage which is applied to the gate terminal of the active switch Sa and keeps it turn off So, the resonant capacitor Cr is disconnected from the primary circuit, and its voltage keeps unchanged. The input voltage Vin keeps the magnetizing current $i_m$ rising linearly, and provides a load current for the secondary circuit. In the secondary circuit, the load current flows through the forward rectifier diode D1 and the output choke L1 to the load.

$$t1 < t < t2 \quad [2]$$

At time t1, the main switch S is turned off. The magnetic current $i_m$ charges the parasitical capacitor Cs, and a negative voltage is couple across the primary winding N1. At the same time, the auxiliary winding Na induces a positive voltage applied to the gate terminal of the active switch Sa. During the time interval of t1 to t2, the gate voltage value of the active switch Sa is lower than its threshold Vg, so the active switch Sa keeps off state. At the secondary side, the forward diode D1 is turned off due to the reverse biased action, and the output choke current freewheels through the freewheeling diode D2.

$$t2 < t < t3 \quad [3]$$

At the time of t2, the primary winding voltage value increases higher than N1*Vg/Na. Correspondingly, the gate voltage value of the active switch Sa is higher than its threshold value Vg. The active switch Sa is turned on, and the resonant capacitor Cr is couple across the primary winding in parallel. So the resonant capacitor Cr together with the parasitic capacitor Cs of the main switch begins to resonate with the magnetizing inductor. The magnetizing current charges the resonant capacitor Cr and resets the transformer core. The magnetizing current decreases gradually to zero and becomes negative. The voltage of the resonant capacitor Cr increases first, and then decreases due to the negative magnetizing current. Since the voltage applied to the primary winding of the transformer Tr is negative, the load current freewheels through the freewheeling diode D2 continually.

$$t3 < t < t4 \quad [3]$$

At time t3, the voltage of the resonant capacitor Cr drops to lower than N1*Vg/Na, and so does the primary winding voltage. Accordingly, the gate voltage value of the active switch Sa is lower than its threshold value Vg, and the active switch Sa is turned off. The resonant capacitor Cr is disconnected form the primary circuit, and its voltage value keeps N1*Vg/Na. Only the parasitical capacitor Cs of the main switch S is left to resonant with the magnetizing inductor continually. The magnetizing current discharges the parasitical capacitor Cs in which the voltage of the parasitical capacitor Cs is decreased continually. At time t4, the voltage of the parasitical capacitor Cs reaches to Vin. That means the voltage of the primary winging reaches to zero.

$$t4 < t < t5 \quad [4]$$

In this time interval, the main switch S keeps off state continually. The voltage of the primary winding remains zero and the output choke current freewheeling through both the forward diode D1 and the freewheeling diode D2. The active switch Sa keeps off state continually due to the zero voltage of the transformer Tr, and the magnetizing current keeps constant until the next time to turn on the main switches S. At time t5, a new switching cycle begins. Since the resonant capacitor Cr is disconnected form the primary circuit, there is no additional resonant capacitor loss.

Therefore, it is known that the active resonant reset forward DC-DC converter of the present invention has a very simple and low cost structure, and it can not only achieve the bi-directional magnetizing of the transformer core and the duty cycle of the main switch larger than 0.5, but also have no additional capacitor loss.

Figure 4:
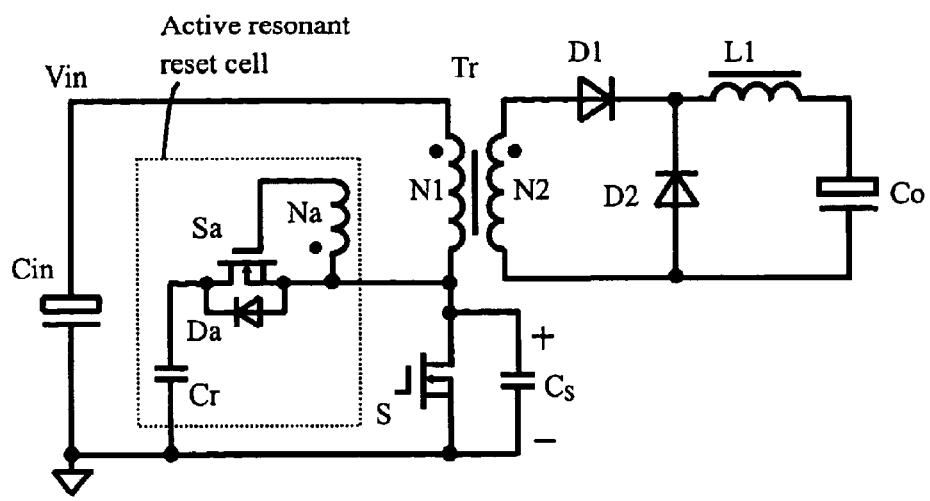
FIG. 4 is a schematic diagram of an active resonant reset forward DC-DC converter in accordance with another preferred embodiment of present invention.

In a further embodiment of this invention, as shown in FIG. 4, the active resonant cell consist of the active switch Sa, the auxiliary diode Da, the auxiliary winding Na coupled with the transformer Tr and the resonant capacitor Cr can be coupled across the main switch S. When the main switch S is turned off, the coupled voltage of the auxiliary winding turns the active switch Sa on, and the resonant capacitor Cr is connected to the parasitical capacitor Cs of the main switch S in parallel. The resonant capacitor Cr accompanies with the parasitical capacitor Cs of the main switch S begins to resonate with the transformer magnetizing inductor. After a half of resonant period, the voltage of the driving winding decreases to lower than the threshold voltage of the active switch Sa and turns it off. The resonant reset capacitor Cr is disconnected from the primary circuit. By this way, the resonant capacitor energy will not dissipate at the time instant when the main switch S is turned on.

Figure 5:
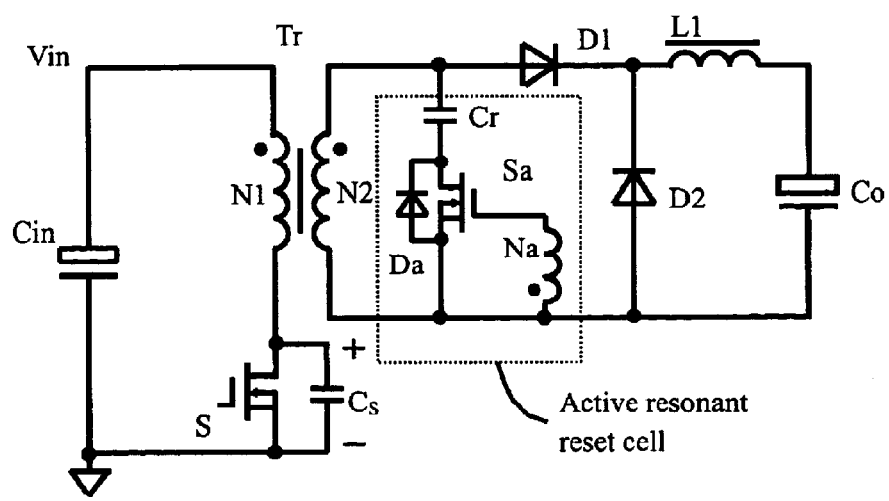
FIG. 5 is a schematic diagram of an active resonant reset forward DC-DC converter in accordance with a further embodiment of present invention.

FIG. 5 shows alternate circuit configuration of this invention. Where the active resonant cell consists of the active switch Sa, the auxiliary diode Da, the auxiliary winding Na coupled with the transformer Tr and the resonant capacitor Cr can also be coupled across the secondary winding N2 of the transformer Tr. When the main switch S is turned off, the coupled voltage of auxiliary winding turns the active switch Sa on, and the resonant capacitor Cr is connected to the secondary winding in parallel, and resets the transformer core in secondary side. After a half of resonant period between the resonant capacitor and the transformer magnetic inductor, the voltage of the driving voltage decreases to lower than the threshold voltage of the active switch Sa and turns it off. The resonant reset capacitor Cr is disconnected from the primary circuit.

Figure 6:
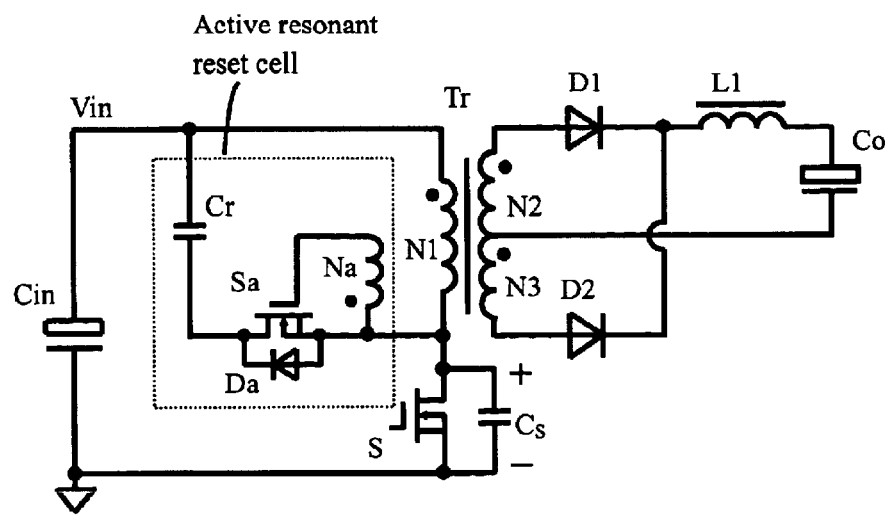
FIG. 6 is a schematic diagram of an active resonant reset forward DC-DC converter with a center-tapped rectifier in accordance with a further embodiment of this invention.

FIG. 6 shows another circuit configuration of this invention, where the rectification circuit is a center-tapped connection topology. The primary circuit including the main switch S, the transformer Tr, and the active resonant snubber has the same circuit configuration as in the previous embodiment. The secondary winding of the transformer Tr has a first and a second terminal connected to two rectification diodes D1 and D2 respectively, and a center connected to a capacitor Co. When the main switch S is turned on, the positive input voltage is coupled across the primary side of the transformer Tr. Such positive voltage is coupled to the auxiliary winding Na to keep the active switch Sa off state, and is coupled to the secondary winding N2 and N3 to keep the first diode D1 being forward biased and the second diode D2 being reverse biased. The energy transfers from the first terminal and the tapping terminal of the secondary winding to the output choke L1 through the diode D1. When S is turned off, a negative voltage occurs on the primary side. Such voltage is coupled to the auxiliary winding to turn on the active switch Sa, and is coupled to the secondary winding to keep the first diode D1 being reverse biased and the second diode D2 being forward biased. By this way, the resonant capacitor Cr is couple across the primary winding of the transformer Tr to reset the transformer. And the energy transfers from the second terminal, and the tapping terminal of the secondary winding of the transformer Tr to the output choke L1 through the diode D2. After a half of resonant period between the resonant capacitor and the transformer magnetic inductor, the voltage of the primary winding decreases to near to zero. The active switch Sa is turned off by the auxiliary winding. Furthermore, the output choke current flows through both the first diode and the second diode, which keeps the primary winding at zero voltage. Since the energy is transferred to the output choke both in the main switch on and off, the output voltage ripple can be reduced significantly.

Figure 7:
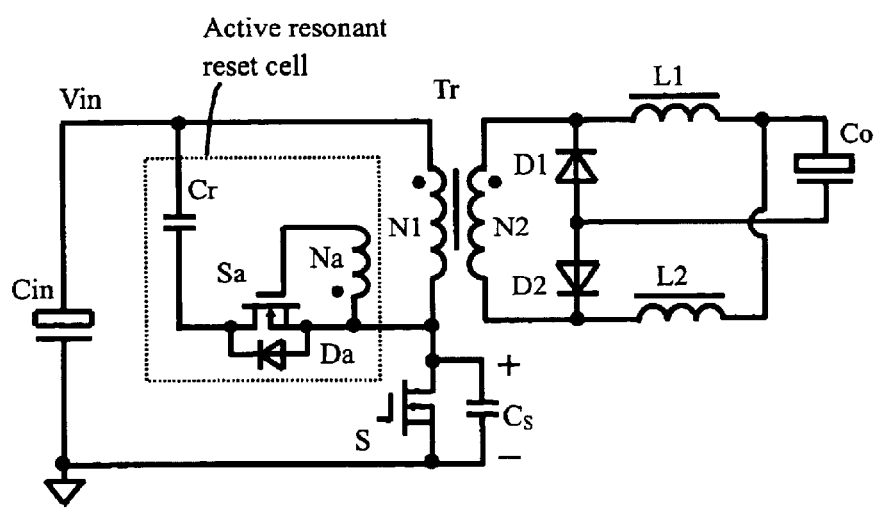
FIG. 7 is a schematic diagram of an active resonant reset forward DC-DC converter with a current doubler rectifier in accordance with a further embodiment of this invention.

FIG. 7 shows another circuit configuration of this invention, where the rectification circuit is in current doubler rectifier connection. The primary side circuit including the main switch S, transformer Tr, and the active resonant snubber has the same circuit configuration and operation principle as in the previous embodiment. In the secondary side, two output chokes L1, L2 are employed as output filter. The energy is transferred to output choke L1 and L2 both in main switch on and off, so the output voltage ripple are reduced significantly.

Figure 8:
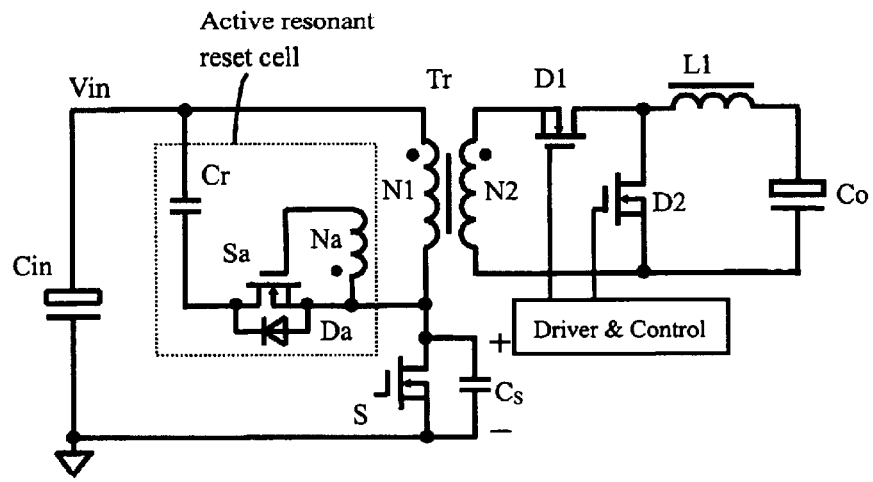
FIG. 8 is a schematic diagram of an active resonant reset forward DC-DC converter with a synchronous rectifier in accordance with a further embodiment of this invention.

FIG. 8 shows another circuit configuration of this invention, where the secondary rectification circuit employs synchronous rectifier. Generally, a driver control circuit is required, which turns on the forward synchronous MOSFET D1 when the main switch S 1 is turned on, and keeps the freewheeling synchronous MOSFET D2 on during the off state of the main switch S.

Figure 9:
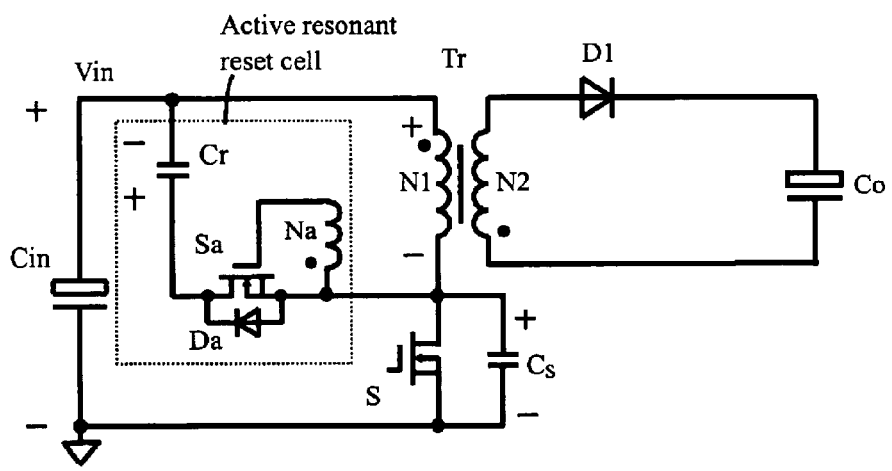
FIG. 9 is a schematic diagram of an active resonant reset flyback DC-DC converter in accordance with a further embodiment of this invention.

FIG. 9 shows another circuit configuration of this invention, where an active resonant snubber is applied to the flyback DC-DC converter. Comparing to the invention of active resonant reset forward DC-DC converter, shown in FIG. 3A, the active resonant reset flyback DC-DC converter is only difference in secondary side. The secondary side circuit includes a secondary winding N2 of the transformer Tr, the diode D1 and the output capacitor Co. The first terminal of the secondary winding N2 is connected to the first terminal of output capacitor Co. The second terminal of the secondary winding N2 is connected to the second terminal of output capacitor Co through the diode D1. The active resonant snubber is connected to the primary winding N1 of the transformer Tr in parallel to reset the transformer.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An active resonant snubber in parallel to a primary winding of a transformer of a DC-DC converter for resetting said transformer, comprising:

a resonant capacitor;

an active switch connected to said resonant capacitor in series;

an auxiliary diode coupled across said active switch in parallel; and an auxiliary winding coupled with said transformer, wherein when a main switch of said DC-DC converter is turned off, said auxiliary winding turns on said active switch, and then said transformer is reset by a resonance between a magnetizing inductor of said transformer and said resonant capacitor.

2. The active resonant snubber according to claim 1, wherein said auxiliary diode is a parasitic diode of said active switch.

3. The active resonant snubber according to claim 1, wherein said main switch has a parasitical capacitor.

4. An active resonant snubber in series to a primary winding of a transformer of a DC-DC converter and in parallel to a main switch of said DC-DC converter for resetting said transformer, comprising:

a resonant capacitor;

an active switch connected to said resonant capacitor in series;

an auxiliary diode coupled across said active switch in parallel; and an auxiliary winding coupled with said transformer, wherein when a main switch of said DC-DC converter is turned off, said auxiliary winding turns on said active switch, and then said transformer is reset by a resonance between a magnetizing inductor of said transformer and said resonant capacitor.

5. The active resonant snubber according to claim 4, wherein said auxiliary diode is a parasitic diode of said active switch.

6. The active resonant snubber according to claim 4, wherein said main switch has a parasitical capacitor.

7. An active resonant snubber in parallel to a secondary winding of a transformer of a DC-DC converter for resetting said transformer, comprising:

a resonant capacitor;

an active switch connected to said resonant capacitor in series;

an auxiliary diode coupled across said active switch in parallel; and an auxiliary winding coupled with said transformer, wherein when a main switch of said DC-DC converter is turned off, said auxiliary winding turns on said active switch, and then said transformer is reset by a resonance between a magnetizing inductor of said transformer and said resonant capacitor.

8. The active resonant snubber according to claim 7, wherein said auxiliary diode is a parasitic diode of said active switch.

9. The active resonant snubber according to claim 7, wherein said main switch has a parasitical capacitor.

* * * * *